APPARATUS FOR REPRODUCING TELEVISION PICTURES

Filed Feb. 16, 1959 2 Sheets-Sheet 1

Fred Mast
Wilfried Janssen
*INVENTORS*

*BY*
Pierce Scheffler & Parker
Attorneys

APPARATUS FOR REPRODUCING TELEVISION PICTURES

Filed Feb. 16, 1959 2 Sheets-Sheet 2

Fred Mast
Wilfried Janssen
INVENTORS

BY
Pierce, Scheffler & Parker
Attorneys

United States Patent Office 3,016,417

Patented Jan. 9, 1962

3,016,417

APPARATUS FOR REPRODUCING TELEVISION PICTURES

Fred Mast and Wilfried Janssen, Zurich, Switzerland, assignors to Gretag Aktiengesellschaft, Zurich, Switzerland, a company of Switzerland Filed Feb. 16, 1959, Ser. No. 793,520
Claims priority, application Switzerland Feb. 25, 1958
9 Claims. (Cl. 178—7.5)

Figure 1:
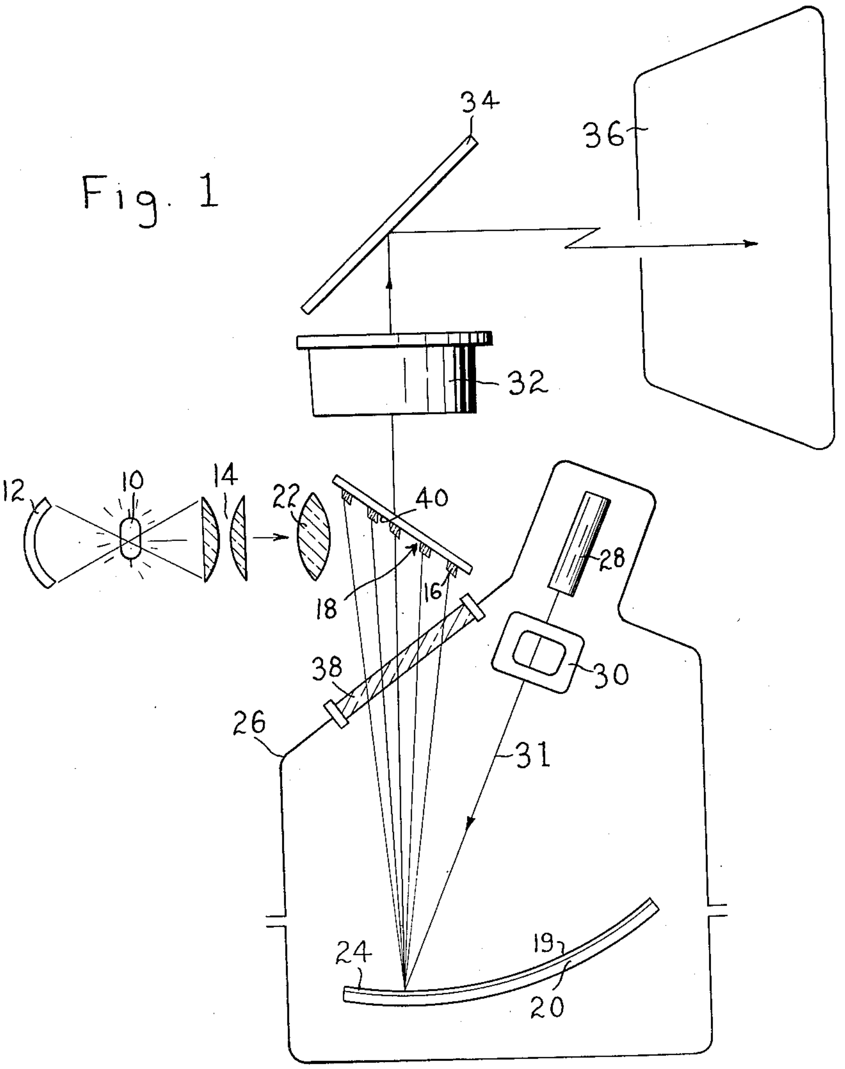

The present invention relates to a method of reproducing television pictures by means of a "Schlieren"-optical system of light control.

A method of projecting television pictures onto large screens with the aid of a Schlieren-optical system of light control has already been described, for example in U.S. Patent 2,644,938, dated July 7, 1953, to Hetzel et al. In such an arrangement a control layer which modulates the light is located in the focussing plane of a Schlieren-optical system generally comprising a plurality of parallel strips or bars with mirror faces, hereinafter referred to as a bar system, and a concave spherical reflector which is coated with the modulation film. Bar system and concave reflector are so disposed that the reflector will reproduce the images of the bars on the bars themselves. A powerful light source illuminates the picture on the modulation film via the mirror faces of the bar system. The surface of the modulation film in the picture field is differentially deformed according to the distribution of brightness in the picture, said deformations being produced by an electron beam which is modulated by the video signal and which in adjacent lines sweeps across the picture field in a manner that is well understood. The electron beam distributes charges on the surface of the modulation film in accordance with the details of the picture and these charges cause the surface to deform in such a way as to produce a uniformly spaced raster or diffraction grating with deformation amplitudes that vary from picture point to picture point. When the surface of the modulation medium is undeformed the light from the illuminating source will be reflected back to the source because the images of the bars are focussed on the reflecting bars themselves. However, as soon as at individual picture points the surface is deformed the light rays reflected from these points of the reflector will more or less pass between the bars so that an objective can project them onto a projection screen.

In known devices of this kind the video signal modulates the rate of deflection (velocity) of the electron beam as it sweeps the lines. This so-called velocity or "pilgrim-step" (two forward, one back) type of modulation of the beam has already been described in British specification No. 546,462. By the provision of a special pair of deflecting plates a high frequency modulating deflection is superimposed upon the sweep deflection along the lines, the frequency of the superimposed deflection being constant but its amplitude being modulated in accordance with the magnitude of the video signal. The electron beam of the cathode ray tube will therefore deposit charges of varying density on the modulation film, giving rise to corresponding deformations of the surface which thus assumes the approximate conformation of a diffraction grating which in the direction of the lines is uniformly spaced because the deflecting frequency is constant, whereas the elevation, i.e. the amplitude, of the deformations which constitute the grating varies according to the video signal. The bars of the Schlieren-optical system which cooperate with this deformation grating are orientated in space perpendicularly to the sweep lines. This method involves considerable complexities to permit the modulation of a frequency oscillation of the required frequency and amplitude. To produce the necessary range for adequately modulating the light a fairly high beam current is required and this also adds to the complications of the system needed for the generation of the electron beam.

The present invention permits the entire system to be substantially simplified. The invention relates to a method of reproducing televized pictures by the deformation in accordance with the video signal of the surface of the modulation film of a Schlieren-optical system by means of an electron beam which sweeps the modulation film in adjacent lines, said surface being then used for modulating a beam of light, the characteristic feature according to the invention consisting in that the beam deposits electrical charges on the modulation film in lanes extending along the picture lines, in such manner that the width across the line at every picture point corresponds with the magnitude of the video signal, and that said width is the greater the lower the brightness of the picture point. Preferably the Schlieren-optics comprises at least one bar system, the bars of which are spatially orientated parallel with the direction of the lines. In another preferred embodiment of the invention the size of the spot produced by the electron beam on the modulation film in dependence upon the video signal increases with decreasing brightness of the picture points.

Figures 2, 3, 4, 5, 6:
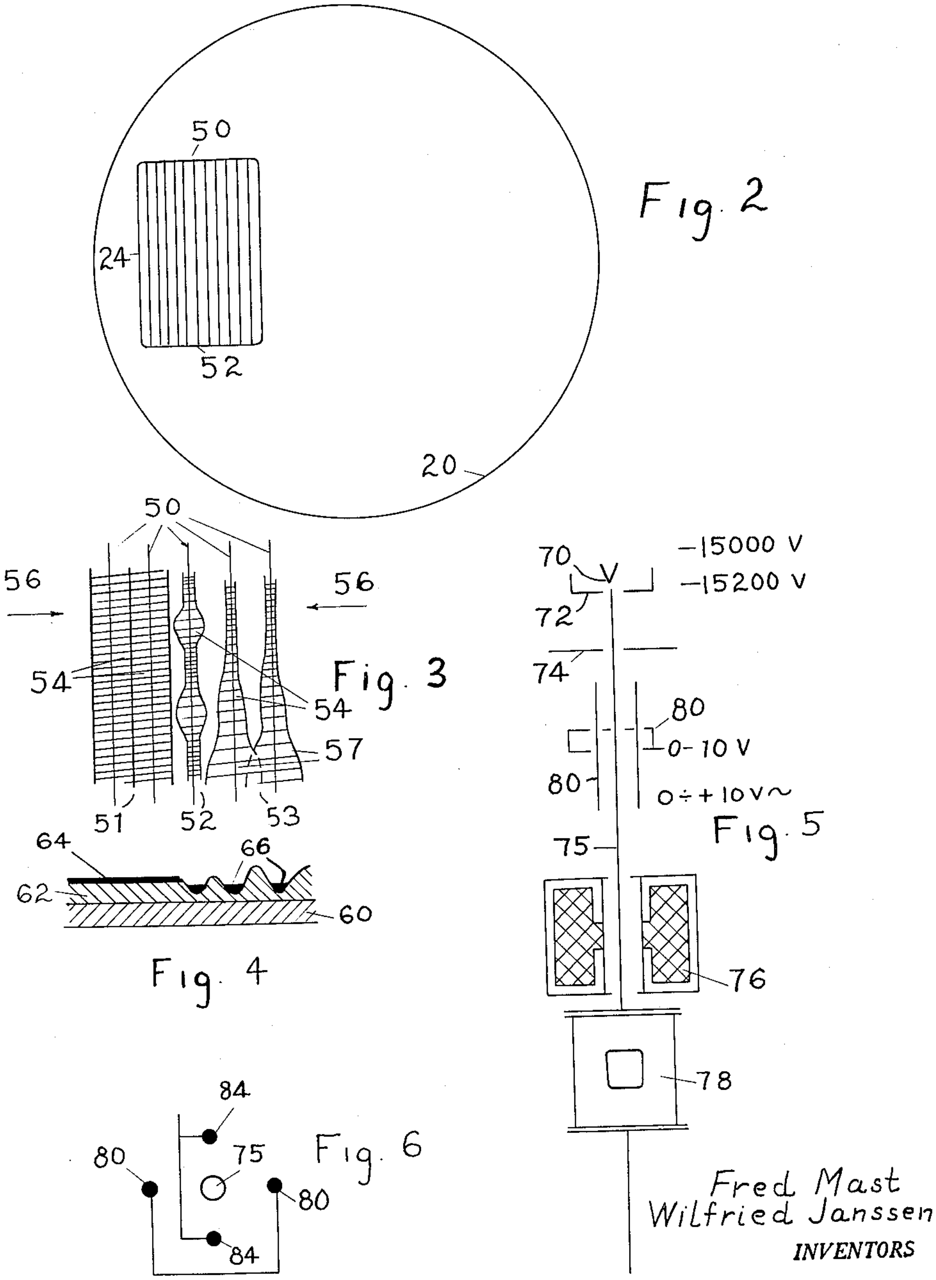

The invention will be hereinafter described in greater detail by reference to an embodiment thereof illustrated in the accompanying drawings in which FIG. 1 shows the principle of an optical control system for the reproduction of television pictures, FIGS. 2, 3 and 4 schematically illustrate the method of modulation according to the invention, and FIGS. 5 and 6 illustrate the cathode ray tube used for performing the method according to the invention.

FIG. 1 schematically illustrates the principle of an optical control system intended for instance for the projection of television pictures. In the illustrated embodiment the source of light is assumed to be a gas discharge lamp 10, a collecting reflector 12 being disposed behind the lamp and a condenser 14 in front. The beam of light falls on the mirror faces 16 of the bars of the reflecting bar system 18 and is reflected thereby on to the modulation medium 19 which is spread out in the form of a thin film on the surface of a concave reflector 20. A lens 22 reproduces the plane of the condenser 14 in the picture field 24. The concave reflector and the electron gun 28 are contained inside an evacuated vessel 26. The electron beam 31, under the control of a magnetic deflecting system 30, sweeps the picture field 24 in adjacent lines and is modulated by the video signal in such a way that the charges deposited on the surface of the modulation film along the points of the picture field 24 will give rise to surface deformation at each picture point of a magnitude depending upon the distribution of brightness over the surface of the picture which it is intended to project. According to representatives the bar system 18 representing the Schlieren-optics is located in the centre of curvature of a concave reflector 20 so that the image of the bars will be situated on the bars themselves. When in a state of rest, that is to say when the surface of the modulation film is undeformed the light from the illuminating source, which is reflected by the mirrored faces of the bars on to the concave reflector, will be returned via the mirror faces of the bars to the light source. However, if the modulation film in the picture field presents a surface which in individual points has been deformed, then the light reflected from these points will experience a deflection depending upon the magnitude (=amplitude) of the deformation in relation to the normal state of rest. With increasing magnitude of deformation an increasing quantity of light will pass through spaces 40 between the bars of the bar system 18 and reach the projecting objective 32 whence, after reflection at a mirror 34, it will fall upon the projection screen 36 (represented on a reduced scale). The projecting objective 32 is arranged to reproduce an image of the picture field 24 on the projection screen 36. A plano-parallel glass plate 38 serves for sealing the evacuated vessel 26 facing the objective 32. Other devices required in the apparatus for rotating and cooling the reflector, for renewing the material of the modulation film and so forth have been omitted in the drawing for the sake of greater clarity. These devices have already been described elsewhere in detail and are not here required for an understanding of the salient features of the invention.

According to the present invention the deformation of the surface of the modulation medium is obtained in apparatus based on the principle underlying the invention by the deposition of charges by the electron beam as it sweeps across the modulation medium in adjacent lines, the width transversely to each line of the swept lane depending in each picture point upon the magnitude of the relative video signal in such a way that said width is greater the lower the brightness of the picture point in question. These charges which are thus deposited in lanes of a width depending upon the magnitude of the video signal generate strip-shaped surface deformations which likewise extend in the direction of the lines the elevation of the deformations being the greater the narrower the width of the charged part of the lane, and these surface deformations then optically cooperate with the mirror bars of the Schlieren-optical system which are orientated parallel with the direction of the lines, to produce the above described optic modulation effect. In a preferred embodiment the deformation of the surface of the modulation film in accordance with the video signal is effected by increasing at least the width of the spot produced by the electron beam, that is to say the distance covered by the spot transversely across the line, in ratio with decreasing brightness in accordance with the video signal. Conveniently this increase in the width of the spot is produced by defocussing the beam. The width of the spot on the modulation film is a minimum, i.e. defocussing of the beam is least, when the video signal represents a point of maximum brightness "white." The darker the picture point in question the larger is the spot on the modulation film, and the more is the beam defocussed. To achieve an optimum control effect defocussing should just be such that a signal corresponding with minimum brightness "black" increases the width of the spot exactly to the distance between two laterally adjacent picture lines.

For performing this method of modulation it would be possible to confine the process to varying the width of the spot transversely across the line. The result of this would be to increase resolution along the line at least in the white (light) parts. However, this would then call for a complicated method of beam control.

FIGS. 2, 3 and 4 illustrate the method proposed by the invention. FIG. 2 shows the concave reflector 20 of the system as seen from above. The picture field 24 is swept by the electron beam 32 in adjacent lines extending parallel to the mirror bars. Preferably the effective width of the spot for reproducing black is arranged to be equal to the distance between two adjacent lines written in two consecutive sweeps. If the generally known technique of interlacing is employed, then this will apply to each half picture (field). The time required for the deformation of the modulation medium to fade out, known as the signal storage time, is so determined that deformation will again be approximately zero at the end of the time required for writing a complete frame, so that consecutive frames will not affect one another.

FIG. 3 is an enlarged section of the picture field swept by the electron beam as it will appear in the type of modulation which consists in varying the spot width. The picture lines are indicated by lines 50. The swept lanes 54 on the surface of the modulation film which collect electric charges are shown hatched. Their width transversely across the lines varies in accordance with local brightness. In lines 51 the width of the lanes is such that the charged zones 54 just touch. In other words, the lane width is then substantially equal to the line spacing. This case corresponds with a picture point of minimum brightness, i.e. a black point in the picture. Naturally the lateral demarcation of the lanes will not be quite as well defined as illustrated in the drawing because the intensity of the spot towards the margins does not change abruptly but decreases to zero in a transition zone. Preferably the spot width corresponding with "black" is arranged to be a little wider than the line spacing, as shown at 57, so that the distribution of charges in the region of overlap between adjacent lanes will be as uniform as possible. However, the principle of modulation is not thereby affected. The lines 52 and 53 on the right hand side illustrate other points of modulation. For instance, in line 53 the brightness of the picture decreases from top to bottom. In the upper part of the lines the spot width is extremely small and the charged zone is thus confined to a very narrow lane. Further down, the spot width becomes greater and the charged area 54 therefore also widens. In other words, the area covered by the spot is increased by defocussing when the brightness of the picture decreases. Line 52 in the centre illustrates conditions in which the brightness of the picture and hence the degree of beam defocussing varies repeatedly within the illustrated length of line. A cross section at the point indicated by arrows 56 in FIG. 3 is shown in FIG. 4. This illustrates the effect of the varying distribution of charges on the surface, the height of the deformations in relation to the thickness of the film being considerably exaggerated for the sake of greater clarity (1/1000 mm. to 1/10 mm.).

The modulation medium 62 covers the surface of the spherical reflector 60 and forms a thin film thereon. The distribution of charges in lines 51 is uniform. Since therefore the forces acting between the collected charges 64 and the reflector surface 60 cannot produce a deformation of the surface of the medium, the light rays from the illuminating source will not be deflected by the optical control system at these points. The corresponding picture point on the projection screen will therefore be dark. However, in lines 53 which roughly represent a zone of maximum brightness of the picture "white," the spot is contracted to its minimum size. The charges 66 are very concentrated. The electrostatic forces which therefore act at this point of the film will cause a strong undular deformation of the surface and this in turn will cause considerable deflection of the light rays of the optical system. The corresponding point on the projection screen will therefore appear "white." In line 52 the medium-sized spot produces a rather wider charged area and the resultant undulating deformation of the surface will therefore be of smaller amplitude, that is to say the wave trough will be shallower and the crest less high than in line 53. Consequently the corresponding point on the projection screen will be of medium brightness.

FIG. 5 schematically illustrates the electrode system of a cathode ray tube required for performing the type of modulation that has been above described. The cathode is a hot hair-pin filament 70 located in a small aperture in the screen 72. Facing the cathode is the anode 74 which is likewise provided with a central aperture. The electrode potentials are given on the right hand side in FIG. 5. For focussing the electron beam 75, which has a constant velocity and constant intensity, a magnetic focussing coil 76 and for its horizontal and vertical deflection a deflecting coil 78 are provided. These components of the cathode ray tube are all well known. For performing the modulation process a toroidal electron-optical system is provided between anode 74 and focussing coil 76. Illustratively this consists of an electrostatic lens comprising two pairs of rods 80 and 84 located parallel with the beam. These rods are placed in quadrature in such manner that the electron beam passes through the centre of the array.

FIG. 6 shows this in section. The two pairs of rods 80 and 84 are parallel with the beam. The pair of rods 84 is normally at anode potential and is biassed during flyback at roughly 100 volts. The resultant degree of defocussing suppresses the beam so that flyback cannot be seen in the picture. The pair of rods 80 employed for picture modulation according to the invention is negatively biassed. The video signal which may have potentials up to +20 volts is now applied to this pair of rods.

The toroidal electron-optical system formed by the pair of rods 80 (or 84) causes axial astigmatism of the electron beam which creates two relatively spaced linear images which are crossed at an angle of 90°. The refractive powers in the two relatively perpendicular principal planes of this lens are of equal absolute magnitude, but of opposite sign, so that the two linear images will appear at equal distances in front of and behind the focussed spot of the electron beam. Midway between these line images, i.e. at the locus of the original spot of the focussed beam, the latter will have an approximately circular section of a diameter roughly proportional to the modulating potentials applied to the cylindrical electron lens. Such toroidal electron lenses with approximately equal refractive powers of opposite sign in their two principal planes are characterized chiefly in that the voltage required for defocussing is very low.

The advantages afforded by the proposed method of modulation reside firstly in that the means and circuitry required for modulation is much simpler than that needed for carrying out the earlier velocity or "pilgrim-step" modulation. Moreover, it is not now necessary to modulate a high frequency voltage of relatively high amplitude, a necessity which requires considerable power of control, instead of which a deflecting voltage will be sufficient for controlling the spot size, which in magnitude does not exceed what is normal in modern television receivers. The charge that must be deposited on the modulation film for modulating the medium may be smaller because, on the one hand, a higher concentration of the charges is obtainable for bright picture points, and, on the other, the raster division which is now determined by the line spacing may be wider than a raster division along the line determined by the frequency of the H.F. voltage. In principle this nevertheless entails no reduction in resolution, i.e. of picture definition, but even improves the same for the following reasons. Across the lines resolution is determined in the earlier method as in the present method by the spacing of the lines. On the other hand, along the lines, resolution is not determined by the raster, as is the case in the earlier method, but merely by the width of the frequency band of the video signal and the geometrical size of the spot in the direction of the lines. In this technique the depth of modulation of charge accumulation, i.e. the ratio of maximum to minimum density of the charges on the modulation medium, is much greater than in the earlier velocity modulation. In view of the greater depth of modulation of the present method the beam current required for producing approximately similar deformations is therefore less. The system employed in the cathode ray tube can thus be simplified and the output of the cathode reduced.

It will be readily understood that the method proposed by the invention is not confined in scope to the specific embodiment and the apparatus that have been illustratively above described. For instance, defocussing could be effected by a conventional separate electrostatic collecting or dispersing lens. However, in such a case the power required for control must be higher, so that the preferred employment of an electrostatic toroidal electron lens for varying spot width by defocussing the beam represents a specially favorable solution.

Furthermore, the deposition on the lines of charges in lanes which vary in width in conformity with the video signal may be achieved otherwise than by varying the size of the spot on the modulation film. For instance, the possibility might be envisaged of "wobbling" a very small spot across the lines at a frequency which is high in relation to the frequency of the time base. The wobble amplitude would then be controlled in dependence upon the video signal. This would also produce a distribution of the charges in lanes as required by the invention.

Likewise, the invention is not limited to Schlieren-optics employing bar systems but may be used with any type of Schlieren-optics through the bar type optics represents a very advantageous solution.

What is claimed is:

1. Apparatus for reproducing television pictures comprising a screen, a light source, a Schlieren-optical system interposed in the optical path between said source and screen, said Schlieren-optical system including a film deformable by modulation of an electron beam and a bar system composed of a plurality of spaced bars, the faces of said bars being arranged oblique to the path of the light rays incoming thereto from said light source and serving to reflect the light from said light source onto said modulatable film, and modulation of said film in conjunction with said bar system serving to effect a corresponding modulation of the light between said source and screen, means for producing said electron beam, means sweeping said beam across said deformable film in adjacent picture lines with constant scanning velocity and constant intensity, and means varying the width of the electrical charges deposited by said beam on said deformable film in accordance with the video signal such that the width of the charges across each picture line corresponds at each picture point to the magnitude of the video signal and varies inversely therewith.

2. Apparatus as defined in claim 1 for reproducing television pictures wherein said means varying the width of the electrical charges deposited by said beam on said deformable film comprises means for varying the size of the spot produced by said beam on said deformable film inversely with the magnitude of said video signal.

3. Apparatus as defined in claim 2 for reproducing television pictures wherein said means for varying the size of the spot produced by said beam on said deformable film comprises means for defocussing said spot inversely with the magnitude of said video signal.

4. Apparatus as defined in claim 1 for reproducing television pictures wherein the width of the electrical charges deposited by said beam on said deformable film is at least equal to the distance between adjacent picture lines when said video signal is a minimum.

5. Apparatus as defined in claim 1 for reproducing television pictures wherein the width of the electrical charges deposited by said beam on said deformable film is greater than the distance between adjacent picture lines when said video signal is a minimum.

6. Apparatus as defined in claim 1 for reproducing television pictures wherein a cathode ray tube is used for producing said electron beam, said tube being provided with a cathode, anode and focusing coil, and wherein said means for varying the width of the electrical charges deposited by said electron beam in accordance with the video signal is constituted by a toroidal electron lens energized by said video signal and located between said anode and focusing coil, said electron lens serving to defocus the spot formed by said electron beam on said deformable film in accordance with the variation in said video signal, the size of said spot varying inversely with the magnitude of said video signal.

7. Apparatus as defined in claim 6 for reproducing television pictures wherein the refractive powers of said toroidal lens in the two relatively perpendicular principal planes of the lens are of approximately like magnitude but of opposite sign.

8. Apparatus as defined in claim 6 for reproducing television pictures wherein said toroidal lens comprises two rods extending parallel with said electrom beam, means biasing said rods in relation to said anode, and means applying a potential representative of the magnitude of said video signal to said rods.

9. Apparatus as defined in claim 6 for reproducing television pictures wherein said toroidal lens comprises four rods arranged parallel with the axis of said electron beam, said rods being interconnected in pairs, means biasing one pair of said rods in relation to said anode and means connecting said one pair of rods to a potential representative of the magnitude of said video signal, the other pair of said rods being normally at the potential of said anode but including means biasing the same for defocusing during flyback to make flyback invisible in the picture.

References Cited in the file of this patent

UNITED STATES PATENTS

| | | |
|---|---|---|
| 2,723,305 | Raibourn | Nov. 8, 1955 |

FOREIGN PATENTS

| | | |
|---|---|---|
| 725,094 | Great Britain | Mar. 2, 1955 |